US012743099B2

(12) United States Patent
Xu

(10) Patent No.: US 12,743,099 B2
(45) Date of Patent: Sep. 22, 2026

(54) AUTONOMOUS MOBILE DEVICE AND OBSTACLE OVERCOMING METHOD AND COMPUTER-READABLE STORAGE MEDIUM

(71) Applicant: Qfeeltech (Beijing) Co., Ltd., Beijing (CN)

(72) Inventor: Sichen Xu, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 171 days.

(21) Appl. No.: 18/747,989

(22) Filed: Jun. 19, 2024

(65) Prior Publication Data

US 2024/0338034 A1 Oct. 10, 2024

Related U.S. Application Data

(63) Continuation of application No. PCT/CN2022/138849, filed on Dec. 14, 2022.

(30) Foreign Application Priority Data

Dec. 28, 2021 (CN) ......................... 202111627965.X

(51) Int. Cl.
*G05D 1/639* (2024.01)

(52) U.S. Cl.
CPC .................................... *G05D 1/639* (2024.01)

(58) Field of Classification Search
CPC ............... G05D 1/639; G05D 2105/10; G05D 2107/40; G05D 2109/10; G05D 1/0236;
(Continued)

(56) References Cited

U.S. PATENT DOCUMENTS

2011/0054689 A1* 3/2011 Nielsen ................ G05D 1/0214 700/258
2015/0150429 A1* 6/2015 Yoo ..................... A47L 11/4011 173/4
2021/0321853 A1* 10/2021 He ...................... A47L 11/4061

FOREIGN PATENT DOCUMENTS

CN 107092260 A 8/2017
CN 107456172 A 12/2017
(Continued)

OTHER PUBLICATIONS

International Search Report and Written Opinion dated Mar. 9, 2023, issued in PCT/CN2022/138849, filed on Dec. 14, 2022, and their English machine translations (12 pages).
(Continued)

*Primary Examiner* — Nga X Nguyen
(74) *Attorney, Agent, or Firm* — Alleman Hall LLP

(57) ABSTRACT

The present disclosure provides an autonomous mobile device and its obstacle overcoming method and a computer-readable storage medium. The method includes: controlling the autonomous mobile device to move in a predetermined obstacle overcoming mode, and then controlling the autonomous mobile device to continue moving. Here moving in a predetermined obstacle overcoming mode includes: controlling the autonomous mobile device to retreat backwardly from a current location for a first distance; applying braking to a second driving mechanism, and controlling a first driving mechanism to rotate forwardly for a first angle around the second driving mechanism; securing the first driving mechanism, and controlling the second driving mechanism to rotate forwardly for a second angle around the first driving mechanism. As such, by utilizing alternate rotation movements of the two driving mechanisms, the autonomous mobile device can move onto a traversable type obstacle or move across the traversable type obstacle.

15 Claims, 11 Drawing Sheets

(58) Field of Classification Search
CPC .... G05D 1/0223; G05D 1/024; G05D 1/0253; G05D 1/0257; G05D 1/0259
See application file for complete search history.

(56) References Cited

FOREIGN PATENT DOCUMENTS

| | | | | |
|---|---|---|---|---|
| CN | 110495825 A | | 11/2019 | |
| CN | 113093725 A | | 7/2021 | |
| CN | 113633222 A | | 11/2021 | |
| CN | 113633222 B | * | 11/2022 | .......... A47L 11/4011 |
| JP | 2018130198 A | | 8/2018 | |

OTHER PUBLICATIONS

Extended European Search Report issued on Aug. 11, 2025, in European Patent Application No. EP 22914249.2, filed on Jul. 2, 2024 (9 pages).

* cited by examiner

AUTONOMOUS MOBILE DEVICE AND OBSTACLE OVERCOMING METHOD AND COMPUTER-READABLE STORAGE MEDIUM

CROSS REFERENCE TO RELATED APPLICATIONS

This application is a continuation of International Application No. PCT/CN2022/138849, filed on Dec. 14, 2022, which claims priority to Chinese Patent Application No. CN202111627965.X, filed on Dec. 28, 2021. The contents of all of the above referenced applications are incorporated herein by reference.

TECHNICAL FIELD

This disclosure relates to smart home technical field, and in particular to an autonomous mobile device and its obstacle overcoming method and a computer-readable storage medium.

BACKGROUND TECHNOLOGY

As the advancement of technology and improvement of living standards, more and more autonomous mobile devices equipped with different functions have entered people's homes, such as cleaning robots, companion type mobile robots, etc., which have made people's life more comfortable and convenient.

Autonomous mobile devices are smart devices configured to autonomously execute predetermined tasks within predetermined work zones. Currently, autonomous mobile devices typically include, but are not limited to, cleaning robots (e.g., smart floor sweeping robots, smart floor mopping robots, window cleaning robots), companion type mobile robots (e.g., smart electronic pets, nanny robots), service type mobile robots (e.g., reception robots for restaurants, hotels, meeting places), industrial patrol and inspection smart devices (e.g., electric power line patrol and inspection robots, smart forklifts, etc.), security robots (e.g., home or commercial use smart guard robots), etc.

During an operation of the autonomous mobile device, it may encounter a traversable type obstacle such as a door sill. When the autonomous mobile device detects a traversable type of obstacle such as a door sill in the environment, it typically moves in a straight line at a constant velocity or at an acceleration to attempt to thrust across the traversable type obstacle, or may first retreat backwardly and then move along an arc to attempt to move around the traversable type obstacle, but may have difficulty in successfully overcoming the traversable type obstacle.

Therefore, how to successfully overcome the traversable type obstacles is an issue that needs to be addressed presently.

SUMMARY OF DISCLOSURE

An objective of the present disclosure is to overcome or at least mitigate the deficiencies of the existing technologies, and to provide an autonomous mobile device and its obstacle overcoming method and a computer-readable storage medium.

According to an aspect of the present disclosure, an obstacle overcoming method for an autonomous mobile device is provided. The autonomous mobile device includes a first driving mechanism and a second driving mechanism that are disposed in parallel. The obstacle overcoming method includes: controlling the autonomous mobile device to move in a predetermined obstacle overcoming mode, then controlling the autonomous mobile device to continue moving. Here, moving in the predetermined obstacle overcoming mode includes: controlling the autonomous mobile device to retreat backwardly from a current location for a first distance; applying braking to the second driving mechanism, and controlling the first driving mechanism to rotate forwardly for a first angle around the second driving mechanism; securing the first driving mechanism, and controlling the second driving mechanism to rotate forwardly for a second angle around the first driving mechanism.

According to another aspect of the present disclosure, an autonomous mobile device is provided, including: a first driving mechanism; a second driving mechanism, the first driving mechanism and the second driving mechanism are disposed in parallel; and a control unit, configured to control the autonomous mobile device to move in a predetermined obstacle overcoming mode, and to control the autonomous mobile device to continue moving. Here, moving in the predetermined obstacle overcoming mode includes: controlling the autonomous mobile device to retreat backwardly from a current location for a first distance; applying braking to the second driving mechanism, and controlling the first driving mechanism to rotate forwardly for a first angle around the second driving mechanism; securing the first driving mechanism, and controlling the second driving mechanism to rotate forwardly for a second angle around the first driving mechanism.

According to another aspect of the present disclosure, a non-transitory computer-readable storage medium is provided, which stores computer program instructions. When the computer program instructions are retrieved and executed by a processor, the disclosed obstacle overcoming method may be executed by the processor. The computer-readable storage medium may be any suitable medium, such as a hard disk, a magnetic disk or tape, an optic disk, a flash disk, a read-only memory, a random-access memory, an erasable programmable read-only memory, an electrically erasable programmable read-only memory, a static random access memory, a programmable read-only memory, a solid-state drive, etc.

According to the present disclosure, the autonomous mobile device equipped with the first driving mechanism and the second driving mechanism that are disposed in parallel moves in a predetermined obstacle overcoming mode. As such, the autonomous mobile device first retreats backwardly from the current location for the first distance, then a condition is maintained in which braking is applied to the second driving mechanism of the two driving mechanisms such that the second driving mechanism is secured without movement or with only slight backward rotation, the first driving mechanism rotates forwardly for the first angle around the second driving mechanism (i.e., the driving mechanism that is applied with braking) thereby moving forwardly, then a condition is maintained in which the first driving mechanism (i.e., the rotating driving mechanism) is secured without movement, the second driving mechanism (i.e., the driving mechanism that is previously applied with braking) rotates around the first driving mechanism for the second angle thereby moving forwardly. As such, by utilizing alternate rotation movements of the two driving mechanisms, the autonomous mobile device is enabled to move onto the traversable type obstacle or move across the traversable type obstacle.

Compared with existing technology in which straight line movement at a constant velocity or at an acceleration is used to attempt to thrust across a traversable type obstacle, in the illustrative embodiment, through the above-described predetermined obstacle overcoming mode, the two driving mechanisms of the autonomous mobile device that are disposed in parallel are controlled to perform alternate rotation movements, thereby enabling the autonomous mobile device to more easily move onto the traversable type obstacle or move across the traversable type obstacle.

In addition, because implementation of the obstacle overcoming method uses the two driving mechanism of the autonomous mobile device and corresponding control units, no new parts such as a new driving mechanism need to be added to the autonomous mobile device. Therefore, compared to the existing technologies in which overcoming obstacles is accomplished by adding corresponding parts in the autonomous mobile device, the obstacle overcoming method of the illustrative embodiments can reduce the cost of overcoming obstacles.

Based on detailed descriptions of illustrative embodiments with reference to the accompanying drawings, other features and aspects of the present disclosure will become clearer.

BRIEF DESCRIPTIONS OF DRAWINGS

The drawings, which are included in the specification and form a part of the specification, together with the specification, show illustrative embodiments, features and aspects of the present disclosure, and are used to explain the principle of the present disclosure.

FIG. 1*a* is a flowchart illustrating an obstacle overcoming method for an autonomous mobile device according to an illustrative embodiment.

FIGS. 1*b*-1*e* are schematics showing four types of door sills according to illustrative embodiments.

FIGS. 2*a*-2*c* are schematics showing the autonomous mobile device moving in a predetermined obstacle overcoming mode to attempt to move across a door sill according to an illustrative embodiment.

FIGS. 3*a*-3*b* are schematics showing parameters of a door sill according to an illustrative embodiment.

FIGS. 4*a*-4*d* are schematics showing the autonomous mobile device moving in a predetermined obstacle overcoming mode to attempt to move across a door sill according to an illustrative embodiment.

Figure 1A:
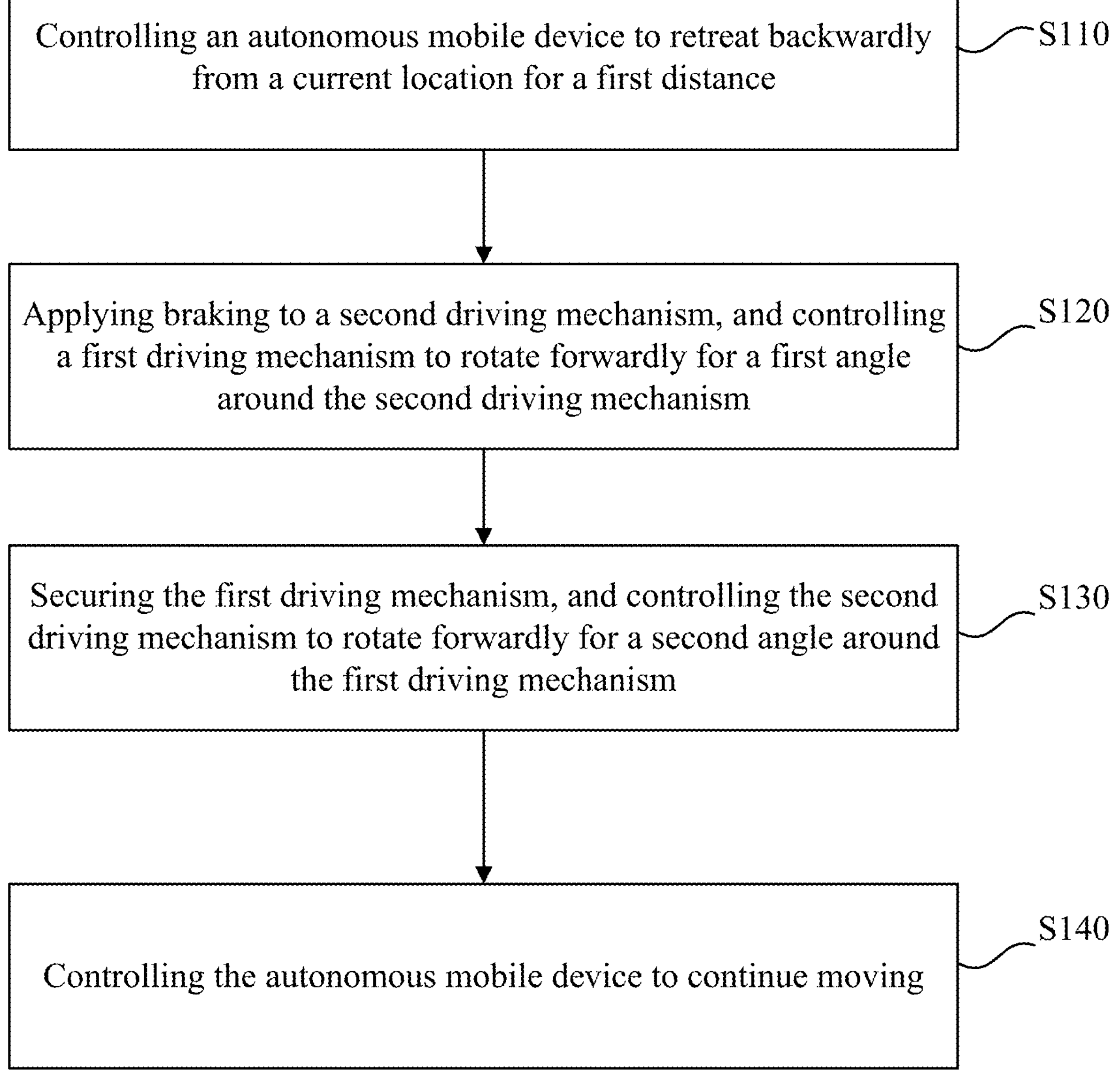

The accompanying drawings, which are included in the specification and form a part of the specification, together with the specification, illustrate illustrative embodiments, features and aspects of the present disclosure, and are used to explain the principles of the present disclosure.

DETAILED DESCRIPTIONS

Next, various illustrative embodiments, features, and aspects of the present disclosure will be described in detail with reference to the accompanying drawings. The same labels in the drawings indicate the same function or similar components. Although various aspects of the embodiments are shown in the accompanying drawings, unless otherwise noted, the drawings are not necessarily to scale.

The term "illustrative" used herein means "as an example, embodiment or explanatory." Any embodiment described by the term "illustrative" should not be interpreted as being advantageous to or better than other embodiments.

In addition, to better explain the present disclosure, in the detailed implementations described below, various specific details are provided. A person having ordinary skills in the art should understand, without certain details, the present disclosure can still be implemented. In some embodiments, methods, means, components and electric circuits that are known to a person having ordinary skills in the art are not described in detail, such that the principle of the present disclosure can be prominently described.

FIG. 1*a* is a flowchart illustrating an obstacle overcoming method for an autonomous mobile device according to an illustrative embodiment. The autonomous mobile device may include, but not be limited to, for example, a smart floor sweeping device, a smart floor mopping device, a floor sweeping-mopping integrated device, a companion type robot, a service type mobile robot, a security robot.

The obstacle overcoming method of the present embodiment may be executed by a control apparatus disposed external to the autonomous mobile device, or may be executed by a control unit of the autonomous mobile device, or may be executed by other component of the autonomous mobile device that is provided with a function of executing the obstacle overcoming method. For the convenience of descriptions, executing the obstacle overcoming method using a control unit of the autonomous mobile device is used as an example to describe the technical solution of the present disclosure.

Here, the autonomous mobile device may have multiple work modes and multiple route planning modes corresponding to the work modes. The multiple route planning modes may include, but not be limited to, for example, a full coverage mode (a movement mode that covers the floor in the work zone as much as possible), an edge following mode (a mode of moving along an edge of an obstacle in the work zone), an obstacle avoidance mode (a mode for avoiding an obstacle when encountering the obstacle), an obstacle overcoming mode (a mode for overcoming traversable type obstacles), a navigation mode, etc. When the autonomous mobile device moves in a certain current route planning mode (e.g., full coverage mode, edge following mode, or navigation mode, etc.), it detects that a traversable type obstacle exists in the work zone, the autonomous mobile device may switch from the current route planning mode to the obstacle overcoming mode, to attempt to move across the traversable type obstacle.

Figure 1B:
Figure 1C:
Figure 1D:
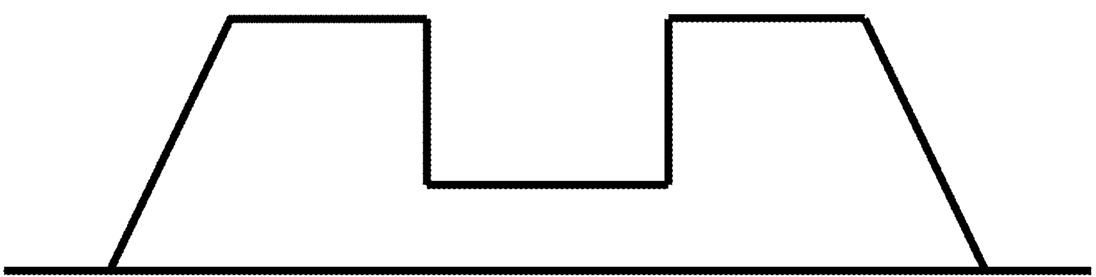
Figure 1E:
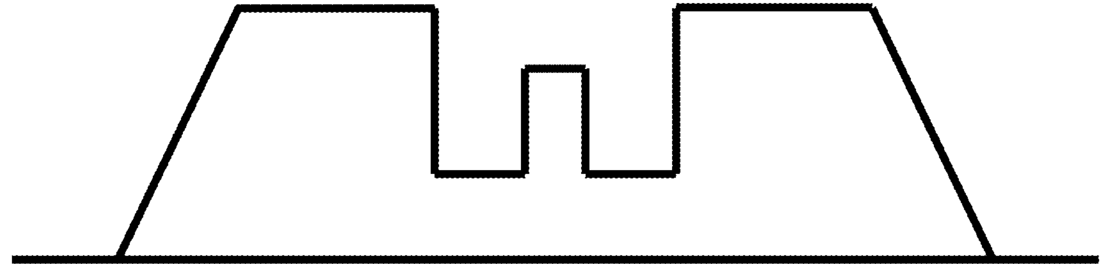

However, even though the autonomous mobile device switches to the obstacle overcoming mode to execute obstacle overcoming actions when detecting that a traversable type obstacle exists in the work zone, if the executed obstacle overcoming actions are not suitable, the autonomous mobile device may still have difficulty in successfully moving across the obstacle. For example, a door sill typically located between two rooms is a common traversable type obstacle. Because a door sill needs to engage with a bottom portion of a room door located above the door sill, bordering portions of the door sill that border with the rooms on two sides have slant surfaces (the cross sections are shown in FIG. 1*b*), or a protrusion (e.g., cross-door stone, the cross section of which is shown in FIG. 1*c*) and/or a groove (e.g., a sliding rail of a glass door, the cross section of which is shown in FIG. 1*d* or FIG. 1*e*) exist in a length direction of the door sill. When the autonomous mobile device encounters, in a forward moving direction, a side surface of the door sill, its driving mechanism (e.g., a wheel set formed by two wheels left-right symmetrically disposed at a bottom portion of the autonomous mobile device) may be jammed due to encountering with a slant slope, a perpendicular surface on one side of the door sill, causing the autonomous mobile device to be unable to successfully move across the door sill.

Therefore, the present disclosure provides an obstacle overcoming method for an autonomous mobile device provided with two driving mechanisms that are disposed in parallel as shown in FIG. 1*a*. By utilizing alternate rotation movements of the two driving mechanisms, the autonomous mobile device is enabled to move onto a traversable type obstacle or move across the traversable type obstacle. As an embodiment, when the autonomous mobile device encounters the traversable type obstacle shown in FIG. 1*b*, the obstacle overcoming method shown in FIG. 1*a* may be executed. The obstacle overcoming method of this illustrative embodiment may include the following steps:

Step S110, controlling the autonomous mobile device to retreat backwardly from a current location for a first distance.

In some embodiments, when a sensor of the autonomous mobile device detects that the autonomous mobile device encounters a traversable type obstacle, or when a control unit of the autonomous mobile device determines that the autonomous mobile device enters a predetermined zone, the obstacle overcoming method of the present disclosure may be triggered. The present disclosure does not limit the condition for triggering the obstacle overcoming method of the present disclosure.

For example, for an autonomous mobile device that uses a distance measuring sensor (e.g., a light detection and ranging (Lidar) device) for mapping and localization, if through an encoder wheel of the autonomous mobile device it is detected that the driving mechanism (e.g., wheel set) is rotating or is not rotating (for example, the driving mechanism may be jammed in front of a slant surface on one side as shown in FIG. 1*b*, in front of a perpendicular surface on one side as shown in FIG. 1*c*, or in front of a slant surface or a groove as shown in FIG. 1*d* or FIG. 1*e*), but the distance measuring sensor detects that the autonomous mobile device does not experience a displacement at a large scale (e.g., greater than a predetermined distance, such as 1 cm, 2 cm, etc.), for example, a detecting beam emitted by the distance measuring sensor detects that a distance between the distance measuring sensor and a surrounding object does not have a change at the large scale, then it may be preliminarily determined that it is possible that the driving mechanism of the autonomous mobile device is jammed, and it is possible that the autonomous mobile device encounters a traversable type obstacle. For example, a control unit of the autonomous mobile device may determine or detect whether the autonomous mobile device is jammed by an obstacle based on one or more signals received from one or more sensors, such as the distance measuring sensor, the encoder wheel, etc.

As another example, if the autonomous mobile device is provided with an imaging sensor (e.g., a camera), and through the encoder wheel of the autonomous mobile device it is detected that the driving mechanism is rotating or is not rotating, if at this moment the imaging sensor of the autonomous mobile device detects that the autonomous mobile device does not experience a displacement at the large scale, for example, if the imaging sensor consecutively obtains a plurality of frames of images of the surrounding environment, and a plurality of corresponding feature points in the plurality of frames of images do not have obvious location changes, then it may be preliminarily determined that it is possible that the driving mechanism of the autonomous mobile device is jammed, and that it is possible that the autonomous mobile device encounters a traversable type obstacle.

In some situations, another existing sensor or a combination of multiple sensors may be used to determine whether the autonomous mobile device encounters a traversable type obstacle. For example, through the encoder wheel it is detected that the driving mechanism of the autonomous mobile device is rotating, but through an anti-fall sensor that is disposed at a front lower portion of the autonomous mobile device and that faces downwardly, it is detected that a distance between a chassis of the autonomous mobile device and the floor is not within a reasonable predetermined range (i.e., the floor under the front portion of the chassis is not a horizontally flat floor, which may be, for example, protruding, having a slope or having a groove), and a wheel-drop sensor has not been triggered (which indicates that the driving mechanism is not suspended in air), then it indicates that the driving mechanism of the autonomous mobile device is blocked by certain obstacle, but the autonomous mobile device has not been lifted up by the obstacle such that the driving mechanism is suspended in air. Therefore, it may be determined that it is possible that the autonomous mobile device may have encountered a traversable type obstacle. The present disclosure does not limit the method for determining whether the autonomous mobile device encounters a traversable type obstacle.

Figure 2A:
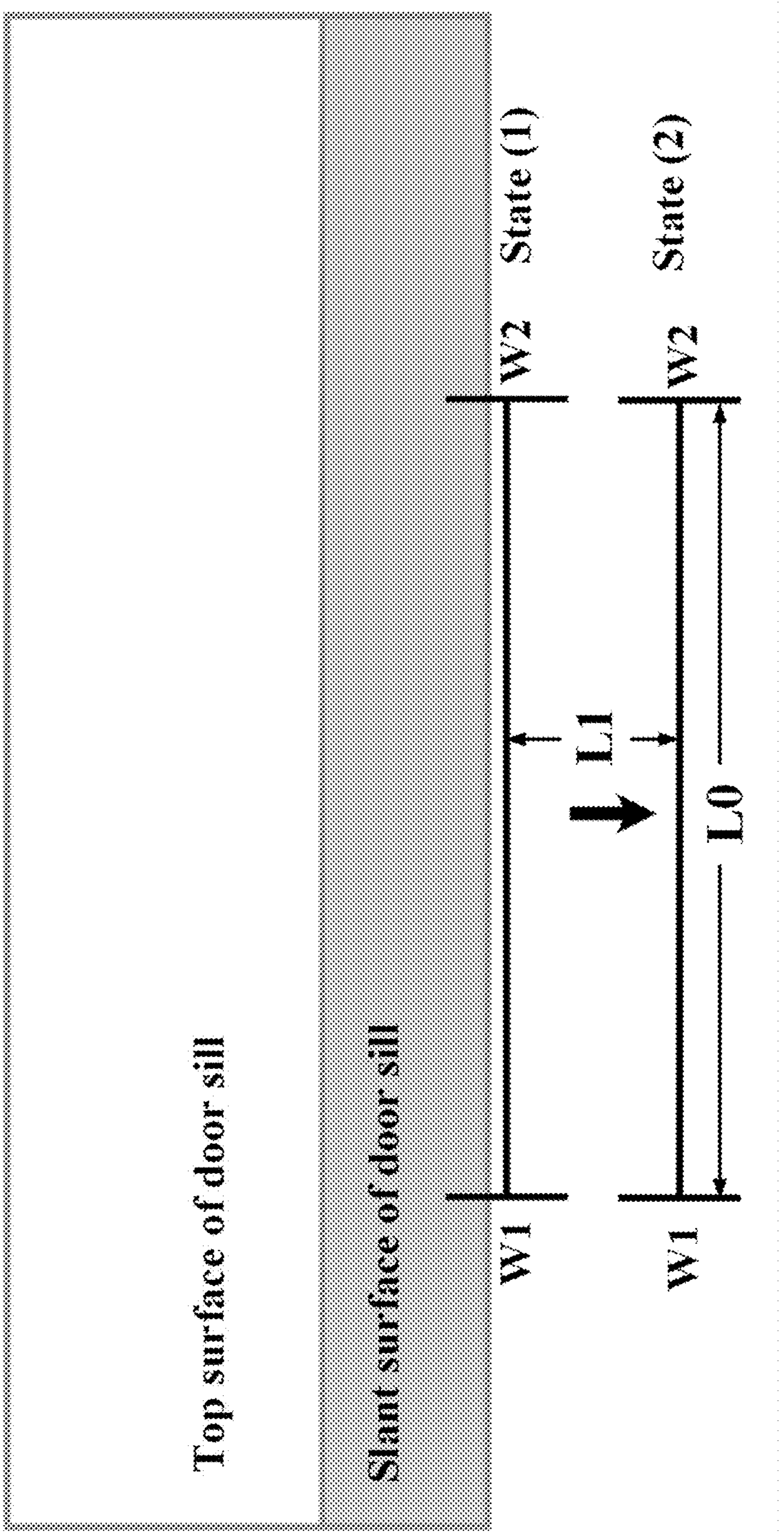

When the autonomous mobile device encounters a traversable type obstacle (e.g., a door sill), the autonomous mobile device may be in state (1) as shown in FIG. 2*a*. At this moment, the above step S110 may be executed. That is, as shown in FIG. 2*a*, a first driving mechanism W1 and a second driving mechanism W2 of the autonomous mobile device may simultaneously move backwardly (i.e., retreat backwardly) from a current location for a first distance L1, such that the autonomous mobile device may retreat backwardly for the first distance L1 when driven by the two driving mechanisms W1 and W2. At this moment, the autonomous mobile device may be in state (2) as shown in FIG. 2*a*.

Here, the reason for retreating backwardly for the first distance may include: providing a space for acceleration before the driving mechanisms arrive at a lower edge of a slant surface of the door sill through rotation, which is involved in step S120 to be subsequently executed. This is because, compared to a driving mechanism having no initial velocity, a driving mechanism having a certain initial velocity can more easily thrust onto the slant surface or the perpendicular surface on a side of the door sill.

In this embodiment, the first distance L1 is a distance needed to provide a space for acceleration before the driving mechanisms of the autonomous mobile device arrive at the lower edge of the slant surface of the obstacle through rotation. A suitable first distance L1 may be set to allow the driving mechanisms to develop a sufficiently large initial velocity when the of the driving mechanisms arrive at the lower edge of the obstacle, such that the driving mechanism can relatively easily move onto the slant surface of the obstacle to arrive at a top surface of the obstacle. The principle for specifically setting the value of the first distance L1 will be described later.

It should be understood that, the first distance L1 may be a predetermined fixed value (for example, an empirical value obtained through experiments), or may be a value obtained through real-time calculation based on work conditions, actual implementation needs, and/or predetermined rules. For example, if an inter-wheel distance between the first driving mechanism W1 and the second driving mechanism W2 (for example, two driving wheels of a wheel set is the first driving mechanism and the second driving mechanism, respectively, then the distance between the two driving wheels is the inter-wheel distance) is L0 (for simplicity of description, an inter-wheel distance between two driving mechanisms is also simply referred to as an inter-wheel distance), then based on heights of most of the currently available door sills, and based on empirical results of multiple experiments, the first distance L1 may be set to be smaller than or equal to ⅓ of the inter-wheel distance. For example, if the inter-wheel distance L0 is 21 cm, then the first distance L1 may be smaller than or equal to 7 cm.

It should be noted that, the method for setting the value of the first distance L1 is not specifically limited in this illustrative embodiment, as long as the distance set can allow the driving mechanisms to develop a sufficiently large initial velocity when arriving at the lower edge of the obstacle, such that the driving mechanisms can relatively easily move onto the slant surface of the obstacle to arrive at the top surface of the obstacle. Any such distance can be set as the first distance L1.

It should be noted that, even when the state of the autonomous mobile device when encountering the traversable type obstacle is not state (1) as shown in FIG. 2*a*, and the forwarding moving direction of the autonomous mobile device is not perpendicular to the lower edge of the slant surface of the traversable type obstacle, but forms an acute angle, in such a situation, the autonomous mobile device may still retreat backwardly for the first distance L1, and execute subsequent steps according the following descriptions, and the autonomous mobile device can still effectively overcome the traversable type obstacle. That is, the initial angle between the autonomous mobile device and the traversable type obstacle when the autonomous mobile device encounters the traversable type obstacle (that is, the angle formed between the forward moving direction of the autonomous mobile device and the lower edge of the slant surface of the traversable type obstacle) may not affect the effectiveness of the obstacle overcoming method of the present disclosure.

In some embodiments, the first distance L1 may be related to the inter-wheel distance L0 between the first driving mechanism and the second driving mechanism of the autonomous mobile device, a shortest distance L3 between the lower edge and an upper edge of the slant surface of the obstacle (hereinafter simply referred to as the shortest distance L3 for simplicity of description), and a first angle $\alpha 1$. For a traversable type obstacle having a relatively long slant surface with a relatively large grade, in addition to being related to the above factors, the first distance L1 may also be related to the grade $\theta$ of the obstacle. For the situation shown in FIG. 1*c*, because one side of this type of traversable obstacle is a perpendicular surface, the first distance L1 is related to the inter-wheel distance L0 and the first angle $\alpha 1$.

It should be noted that, the term "related" in the present disclosure is only used to indicate the correlation between various parameters, and does not indicate the order and cause-effect relationship between the parameters. For example, the above-described "the first distance L1 is related to the inter-wheel distance L0 and the first angle $\alpha 1$," it may be the case that the inter-wheel distance L0 and the first angle $\alpha 1$ are first determined, and then the first distance L1 is determined based on these two parameters, or it may be the case that the inter-wheel distance L0 and the first distance L1 are determined, and then the first angle $\alpha 1$ is determined based on these two parameters.

Figure 2B:
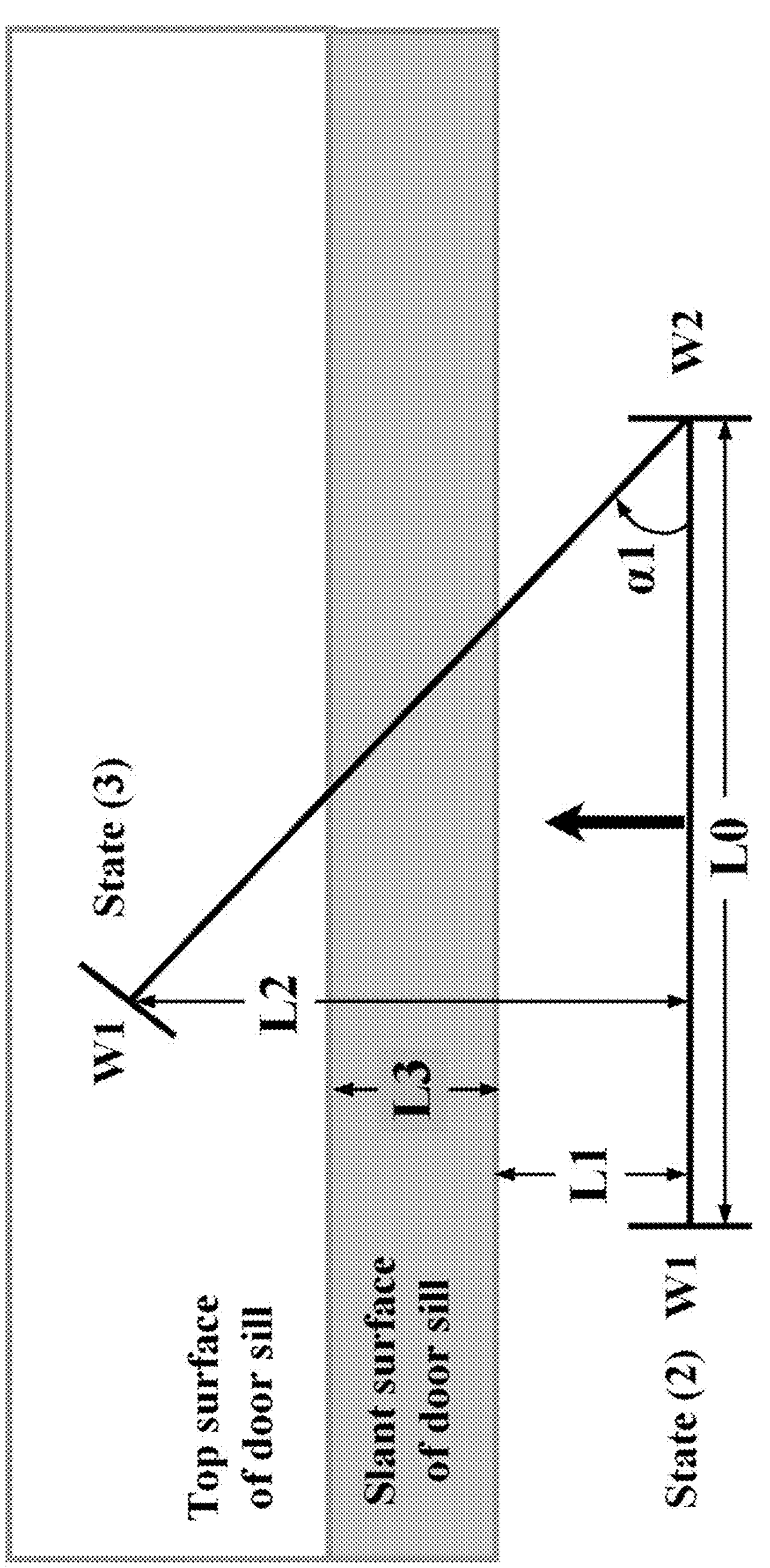
Figure 3A:
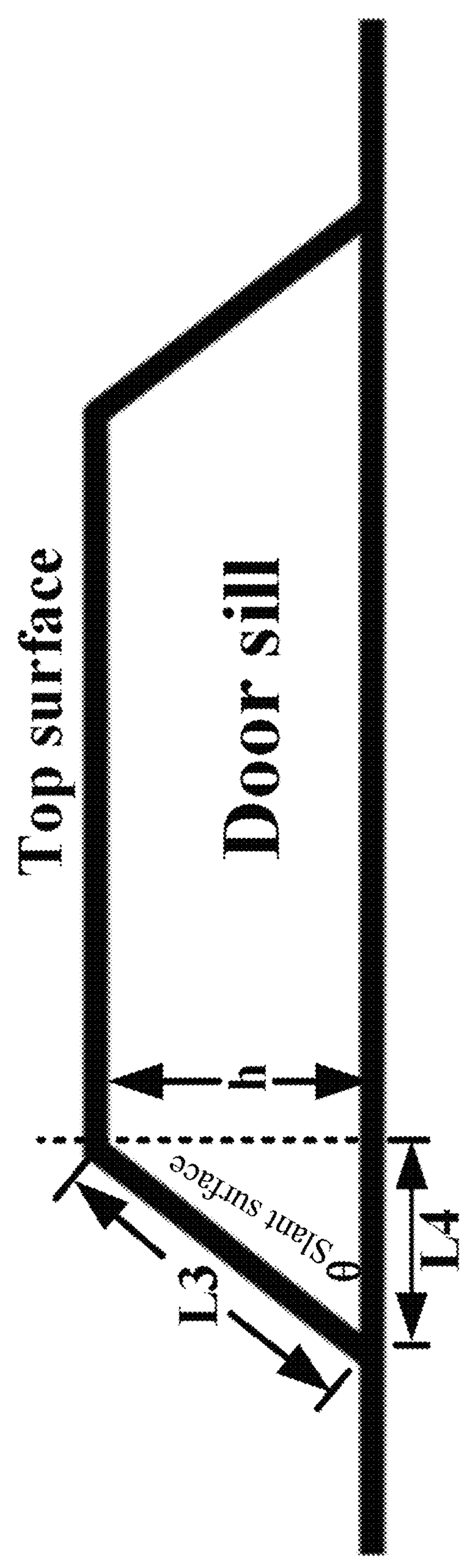

Referring to FIG. 2*b* as an example, in this embodiment, when selecting the first distance L1, the following parameters may be taken into account: the shortest distance L3, the inter-wheel distance L0, and the first angle $\alpha 1$. In other words, the first distance L1 may be selected based on the shortest distance L3, the inter-wheel distance L0, and the first angle $\alpha 1$. Alternatively, the first angle $\alpha 1$ may be selected based on the inter-wheel distance L0, the first distance L1, and the shortest distance L3. The grade $\theta$ of the door sill is typically not too large, and the door sill is not too high. In such situations, as shown in FIG. 3*a*, the difference between the shortest distance L3 and its horizontally projected component distance L4 when projected onto a horizontal plane is not large, the two may be deemed approximately equal, and there is no need to know the grade $\theta$. But there are situations where the grade $\theta$ is relatively large, then the grade $\theta$ need to be considered.

In this embodiment, the first distance L1 may be selected based on the shortest distance L3, the inter-wheel distance L0, and the first angle $\alpha 1$. For example, the first distance L1 may be selected based on the shortest distance L3, the inter-wheel distance L0, and the first angle $\alpha 1$ to satisfy this relationship: $(L1+L3)/L0 \geq A \times \tan(\alpha 1)$ ($\tan(\alpha 1)$ is the tangent of $\alpha 1$), A is a coefficient that is greater than or equal to 1, such as A=1.2. As another example, the first distance L1 may be selected based on the shortest distance L3, the inter-wheel distance L0, and the first angle $\alpha 1$ to satisfy this relationship: $(L1+L3)/L0 \geq B \times \sin(\alpha 1)$ ($\sin(\alpha 1)$ is the sine of $\alpha 1$), B is a coefficient greater than or equal to 1, such as B=1.7. It should be noted that, A=1.2 and B=1.7 are only empirical values. Suitable A and B may be set based on this relationship: $A \times \tan(\alpha 1)$ is substantially or approximately equal to $B \times \sin(\alpha 1)$. For example, if A is 1, then B may be 1.4; if A is 1.1, then B may be 1.5; if A is 1.3, then B may be 1.8.

In some embodiments, the first distance L1 may be smaller than the inter-wheel distance L0.

In this embodiment, considering that by rotating for a certain angle, the driving mechanism may move onto the traversable type obstacle, i.e., by rotating for a certain angle, the driving mechanism may move onto the top surface of the traversable type obstacle, however, a situation may exist in which even if the driving mechanism rotates for 90°, the driving mechanism still cannot arrive at the top surface of the obstacle. In this situation, it may be difficult for the driving mechanism to move onto the obstacle. To address this situation, the first distance L1 may be set to be smaller than the inter-wheel distance L0, such that the situation in which even if the driving mechanism rotates for 90°, the driving mechanism still cannot arrive at the top surface of the obstacle, can be avoided.

Based on reasons similar to the inter-wheel distance, when selecting the first distance L1, the shortest distance L3 is considered, which will be described below with reference to the grade $\theta$. For convenience of understanding, the door sill shown in FIGS. 3*a*-3*b* is used as an example for the descriptions.

Figure 3B:
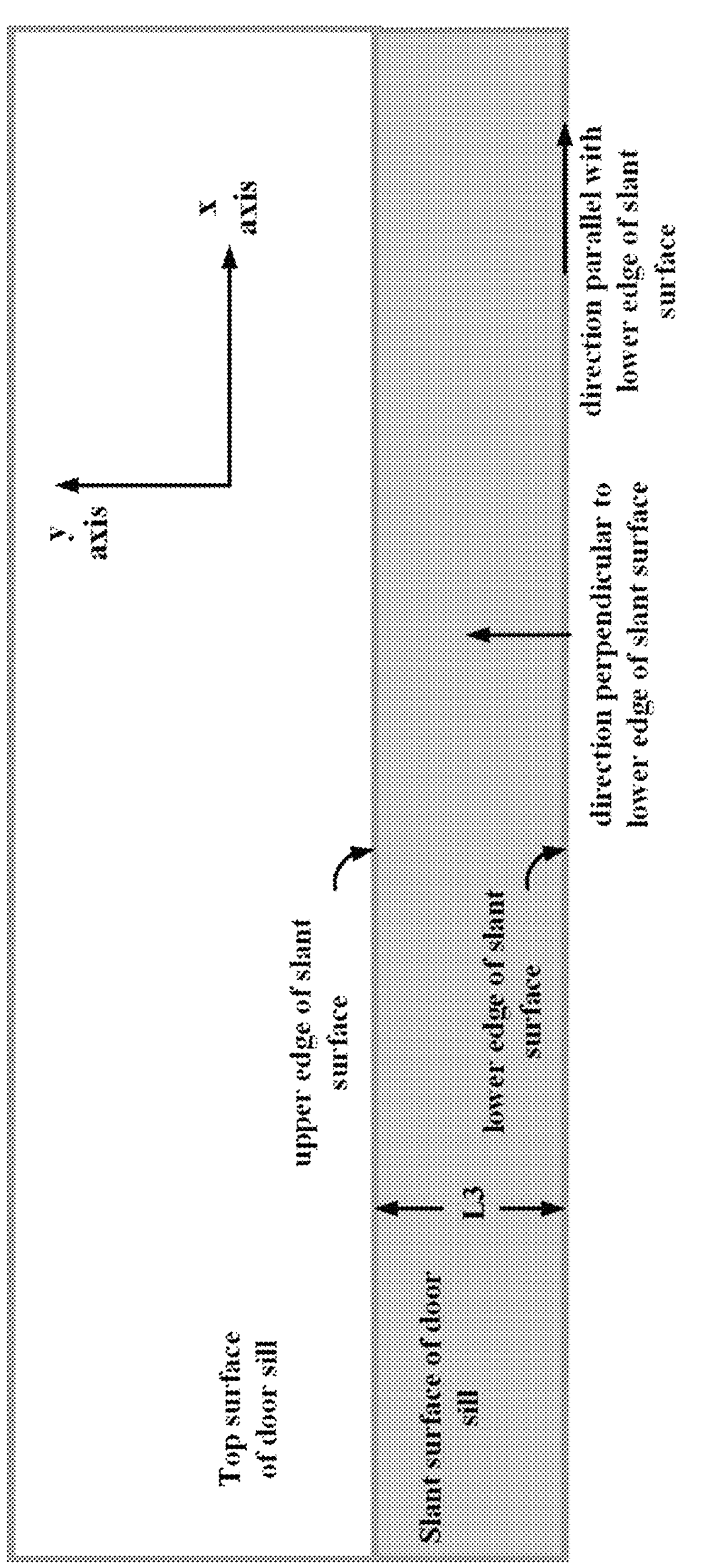

As shown in FIG. 3*b*, the grey portion represents the slant surface of the door sill, the white portion represents the top surface of the door sill. As shown in FIG. 3*a*, the two sides of the door sill are inclined slant surfaces. The middle portion of the door sill is the flat top surface. The grade of the slant surface is $\theta$, the shortest distance between the lower edge and the upper edge of the slant surface is L3. The shortest distance L3 is a length of a line between the lower edge and the upper edge that is perpendicular to the lower edge and the upper edge. The projected distance of the shortest distance L3 projected onto a horizontal plane, i.e., the horizontally projected component distance, is L4, the height of the door sill is h. According to FIG. 3a and geometry, the shortest distance L3, the horizontally projected component distance L4 are related to the height h and the grade θ. For example, sin (θ)=h/L3, cos (θ)=L4/L3 (cos(θ) is the cosine of θ).

It should be understood that, the larger the grade θ, the easier for the autonomous mobile device to be jammed on the slant surface, causing the autonomous mobile device to be unable to overcome the slant surface. As such, the larger the grade θ, under the condition that the inter-wheel distance L0 is the same and the first angle α1 to be rotated is the same, the smaller the first distance to be retreated backwardly, such that the driving mechanism can craw up the slant surface at a more inclined direction (described below). However, in the meantime, there is a need to provide a sufficiently large initial velocity of the driving mechanism when the driving mechanism arrives at the lower edge of the door sill such that it is relatively easier for the driving mechanism to move onto the slant surface to arrive at the top surface. Therefore, a suitable first distance L1 may be selected in light of the above needs.

In some embodiments, the first distance L1 may be greater than or equal to 1/11 of the inter-wheel distance L0 and smaller than or equal to 1/3 of the inter-wheel distance L0. For example, the inter-wheel distance L0 may be 22 cm, then the range of the value of the first distance L1 may be [2 cm, 7.3 cm].

In some embodiments, the range of the value of the first distance L1 may be [2 cm, 7 cm], i.e., the first distance L1 may be greater than or equal to 2 cm and smaller than or equal to 7 cm.

In some embodiments, the first distance L1 may be 5 cm.

After the autonomous mobile device retreats backwardly for the first distance L1, the following step S120 may be executed.

Step S120, applying braking to the second driving mechanism W2 such that the second driving mechanism is secured or only slightly rotates in an opposite direction, and controlling the first driving mechanism W1 to rotate forwardly for a first angle around the second driving mechanism W2. This process is similar to a process of drawing an arc using the secured second driving mechanism W2 as a center of a circle, and using the inter-wheel distance L0 as the radius. The arc is the trajectory of the movement of the first driving mechanism W1. The "braking" in the present disclosure means that a driving motor or a braking mechanism of the driving mechanism applies a braking force on the driving mechanism to resist the corresponding movement of the driving mechanism; or the driving motor applies a braking force in an opposite direction on the driving mechanism such that the driving mechanism slightly rotates in the opposite direction. Here, the phrase "rotates in the opposite direction" in the phrase "such that the driving mechanism slightly rotates in the opposite direction" means rotating in an opposite direction relative to the movement in the forward moving direction of the autonomous mobile device caused by the driving mechanism. For example, if a clockwise rotation of the driving mechanism can cause the autonomous mobile device to move in its forward moving direction, then "rotates in the opposite direction" is a rotation in the counter-clockwise direction. Here, the phrase "slightly rotates" may be gauged by the rotation angle or rotation rounds, for example, rotating for 180° or rotating 1-5 rounds; or may be gauged by the actual displacement of the driving mechanism on the floor. For example, the displacement of the driving mechanism on the floor may be controlled to be smaller than 10 cm. The braking mechanism may be, for example, any braking mechanism in the existing technology, such as a ratchet braking mechanism, a slip ring centrifugal braking mechanism, a belt braking mechanism, or an electromagnetic braking disposed on the driving mechanism, etc. The present disclosure does not limit the specific method of braking and the specific implementation of the braking mechanism.

Step S130, securing the first driving mechanism W1, and controlling the second driving mechanism W2 to rotate forwardly for a second angle around the first driving mechanism W1. This process is similar to a process of drawing an arc using the secured first driving mechanism W1 as a center of a circle, and using the inter-wheel distance L0 as the radius. Here the arc is the trajectory of movement of the second driving mechanism W2. Here, securing the first driving mechanism W1 may be achieved by a driving motor or a braking mechanism applying a braking force to the driving mechanism such that the driving mechanism is stationary, or may be achieved by the driving motor not applying a driving force on the driving mechanism such that the driving mechanism does not have active movement without considering follower movement of the driving mechanism caused by other conditions.

In some embodiments, the autonomous mobile device includes at least two driving mechanisms W1 and W2 that are disposed in parallel. The configuration of these two driving mechanisms W1 and W2 may include, but not be limited to, left-right symmetric configuration. After the two driving mechanisms W1 and W2 of the autonomous mobile device retreat backwardly together for the first distance L1, braking may be applied to one driving mechanism of the autonomous mobile device, such as the second driving mechanism W2, such that the second driving mechanism W2 is stationary or only slightly rotates in an opposite direction. In the meantime, the other driving mechanism such as the first driving mechanism W1 may be controlled to rotate at a suitable velocity or acceleration for a predetermined angle around the second driving mechanism W2 that is applied with the braking, thereby achieving a displacement component of forward movement. Then the previously rotating driving mechanism, i.e., the first driving mechanism W1 may be maintained stationary, and the driving mechanism to which braking was previously applied, i.e., the second driving mechanism W2, may rotate for a predetermined angle, at a suitable velocity or acceleration around the now secured driving mechanism W1 (the velocities and/or accelerations of the driving mechanisms W1 and W2 may be the same or different), thereby achieving a displacement component of forward movement. Accordingly, alternating forward movements of the two driving mechanisms W1 and W2 are realized. As such, by utilizing alternate rotation movements of the two driving mechanisms, the autonomous mobile device is enabled to move onto the traversable type obstacle or move across the traversable type obstacle.

In actual practice, if the two driving mechanisms (e.g., driving wheels) move forwardly together, the two driving wheels may not touch the edge of the obstacle at the same time. Under this condition, it is typical that one driving wheel first touches the edge of the obstacle, and at this moment the other driving wheel has not touched the edge of the obstacle. Because the two driving wheels are in a moving state, the driving wheel positioned at the back that does not touch the edge of the obstacle (relative to the position of the other driving wheel) may not provide a sufficient supporting force to the driving wheel positioned at the front that touches the edge of the obstacle, to cause the driving wheel positioned at the front to roll onto the slant surface or the perpendicular surface of the obstacle. Specifically, when the driving wheel positioned at the front that first touches the edge of the obstacle and that has started rolling on the slant surface has moved up along the slant surface for a predetermined height, the body of the autonomous mobile device has experienced a certain inclination. The weight of the body may not be evenly distributed onto each supporting point of the wheel set, but more weight may be applied onto the driving wheel positioned at the back (because at this moment the driving wheel positioned at the back is at a lower location than the driving wheel positioned at the front). At this moment, because the driving wheel positioned at the back is also in motion, it is subject to push by a component force of the gravity of the autonomous mobile device projected in a downward direction along the slant surface, and therefore tends to move in a direction parallel with the lower edge of the slant surface, and oftentimes tends to have a horizontal displacement, or even tends to be pushed away from the obstacle by the component force of gravity of the autonomous mobile device projected in the downward direction along the slant surface. Therefore, it may be difficult to provide an upward total force to cause the autonomous mobile device to overcome the obstacle. In embodiments of the present disclosure, using the driving wheel under braking as a support point, the other driving wheel may thrust onto the edge of the obstacle at a certain velocity, then the driving wheel under braking may not have a motion (or displacement) component that is parallel with the lower edge of the slant surface, and therefore, it may not experience turns and sideway horizontal displacements. Therefore, a sufficient support force can be provided to the driving wheel in motion, making it easier for the autonomous mobile device to overcome the traversable type obstacle under the same horsepower.

For convenience of simplicity, a discussion is provided about the forward moving direction of the autonomous mobile device being perpendicular to the lower edge of the slant surface of the traversable type obstacle. For convenience of description, a direction perpendicular to the lower edge of the slant surface as shown in FIG. 3*b* is referred to as the "forward facing direction," a motion of the driving mechanism along the inclined ascending slant surface toward the top surface in the forward facing direction is referred to as "driving mechanism moves along the forward facing direction," and a motion of the driving mechanism along the inclined ascending slant surface toward the top surface in a direction that is not perpendicular to the lower edge of the slant surface is referred to as "driving mechanism moves along a non-forward facing direction."

Compared with the situation in which the driving mechanism moves along the forward facing direction (the actual grade that the driving mechanism needs to overcome at this moment is $\theta$), in a situation in which the driving mechanism moves along a non-forward facing direction (the actual grade that the driving mechanism needs to overcome at this moment is smaller than $\theta$), the grade of the slant surface on which the driving mechanism actual moves is more gradual. Therefore, when the driving mechanism moves along a non-forward facing direction along the slant surface, it is easier for the driving mechanism to overcome the inclined slant surface under the same power. As such, the driving mechanism is controlled to rotate for the first angle, such that the driving mechanism can overcome the obstacle more easily.

In some embodiments, a suitable first angle $\alpha 1$ may be selected such that a displacement component L2 of the rotating driving mechanism in a direction perpendicular to the lower edge of the slant surface (for simplicity of description, also referred to as displacement component L2 in the present disclosure) is sufficient to overcome the first distance L1 and the shorted distance L3 between the lower edge and upper edge of the slant surface of the door sill (for simplicity of description, also referred to as a shortest distance L3), thereby arriving at the top surface of the door sill. That is, the first angle $\alpha 1$ may be selected to satisfy the relationship of $L2>L1+L3$, where $L2=L0\times\sin(\alpha 1)$ or $L2=L0\times\tan(\alpha 1)$.

In some embodiments, the first angle $\alpha 1$ may be greater than or equal to 30° and smaller than or equal to 90°. In some embodiments, the first angle $\alpha 1$ may be greater than or equal to 40° and smaller than or equal to 60°. In some embodiments, the first angle $\alpha 1$ is 45°.

In some embodiments, the first angle $\alpha 1$ and the first distance L1 may be selected based on the width and height of the door sill. Using selecting the first angle $\alpha 1$ such that it satisfies the relationship of $L2>L1+L3$, where $L2=L0\times\sin(\alpha 1)$, as an example, for instance, illustratively, if the height h of the door sill is 2 cm and the width is 15 cm (here, bottom edges L4 of the two symmetric slant surfaces are both 4.6 cm, the width of the top surface is 5.8 cm), then based on the Pythagorean theorem, the length L4 and the height h, the shortest distance L3 may be calculated to be 5 cm; based on the Sine law, the arcsine of the grade $\theta$ may be calculated as $2\div 5=0.4$, and the grade $\theta$ may be calculated as 23.58°. Based on the above setting method, the first angle $\alpha 1$ may be selected as 45°, the corresponding displacement component L2 is 15.55 cm, the first distance L1 is 5 cm. In some embodiments, the second angle $\alpha 2$ may be equal to the first angle $\alpha 1$. In some embodiments, the first angle $\alpha 1$ for which the first driving mechanism W1 rotates forwardly may be equal to the second angle $\alpha 2$ for which the second driving mechanism W2 rotates forwardly. As such, a wheel axis direction may be made substantially parallel with a wheel axis direction after the first driving mechanism W1 and the second driving mechanism W2 have simultaneously retreated backwardly for the first distance L1.

The principle for setting or selecting the value of the second angle is similar to the principle for setting or selecting the value of the first angle. Due to the limitation of space, the principle for setting or selecting the value of the second angle is not described in detail.

In addition, although this embodiment describes applying braking to the second driving mechanism and controlling the first driving mechanism to rotate forwardly for a certain angle around the second driving mechanism (simply referred to as a first implementation), in some embodiments, the first driving mechanism may be applied with braking and the second driving mechanism may be controlled to rotate forwardly for a certain angle around the first driving mechanism (simply referred to as a second implementation). The principle of the second implementation is basically similar to the principle of the first implementation. Due to the limitation of space, the second implementation is not described in detail.

In the present disclosure, through executing steps S110, S120 and S130, the two driving mechanisms of the autonomous mobile device may be controlled to perform alternate rotations, thereby enabling the autonomous mobile device to move onto the traversable type obstacle or move across the traversable type obstacle. The order in which the driving mechanisms of the autonomous mobile device move onto the obstacle may be different. Thus, step S130 may be executed first before step S120 is executed.

After the two driving mechanisms of the autonomous mobile device have rotated forwardly for a certain angle, step S140 may be executed.

Step S140, controlling the autonomous mobile device to continue moving.

In embodiments of the present disclosure, through executing steps S110, S120 and S130, the two driving mechanisms of the autonomous mobile device may be controlled to rotate alternately, thereby enabling the autonomous mobile device to move onto the traversable type obstacle or move across the traversable type obstacle. Subsequently, the autonomous mobile device may choose a process to be executed (or choose a moving mode) based on the work condition, current environment, received instructions, etc.

In some embodiments, the autonomous mobile device may choose to restore a previous motion state that is a state at a time instance when it was jammed by the obstacle. As described above, when the autonomous mobile device is jammed by the traversable type obstacle, a process currently being executed by the autonomous mobile device may be suspended, thereby triggering the execution of steps S110, S120 and S130 to attempt to move through or move across the traversable type obstacle. Subsequently, the autonomous mobile device may choose to restore the previous execution of the temporarily suspended process, i.e., the autonomous mobile device may continue moving in a previous moving mode, in which it was moving when it was jammed by the obstacle. For example, if the autonomous mobile device was executing a zig-zag full coverage mode when it was jammed, then after it moves through the traversable type obstacle, the autonomous mobile device may restore the execution of the previous full coverage mode.

In some embodiments, the autonomous mobile device may choose to move in a new moving mode. After attempting to move through or move across the traversable type obstacle, instead of restoring the previous execution of the temporarily suspended process, the autonomous mobile device may choose a new moving mode such as a turning-while-moving-forward mode or a straight-line-moving-forward mode, and may move in the new moving mode. For example, if after moving across the traversable type obstacle, the autonomous mobile device chooses the straight-line-moving-forward mode, then the first driving mechanism and the second driving mechanism that are located on the traversable type obstacle may be controlled to move forwardly simultaneously.

Therefore, in this embodiment, the autonomous mobile device may first move in a predetermined obstacle overcoming mode (i.e., execute the above steps S110, S120 and S130, to attempt to move through or move across the traversable type obstacle), and then continue moving (i.e., execute the above step S140).

According to the obstacle overcoming method of this illustrative embodiment, the autonomous mobile device equipped with the first driving mechanism and the second driving mechanism that are disposed in parallel moves in a predetermined obstacle overcoming mode, and after overcoming the obstacle, the autonomous mobile device may continue moving, for example, in a previously suspended moving mode or in a newly chosen moving mode. Here, in the predetermined obstacle overcoming mode, the autonomous mobile device may first execute a backward retreat operation, and then may apply braking to the second driving mechanism and control the first driving mechanism to rotate for a certain angle around the second driving mechanism. Subsequently, the first driving mechanism may be secured (e.g., braking may be applied to the first driving mechanism) and the second driving mechanism may be controlled to rotate for a certain angle around the first driving mechanism. As such, by utilizing the alternate rotation movements of the two driving mechanisms, the autonomous mobile device is enabled to move onto the traversable type obstacle or move across the traversable type obstacle.

Compared with existing technology in which straight line movement at a constant velocity or at an acceleration is used to attempt to thrust across the traversable type obstacle, in the illustrative embodiment, through the above-described predetermined obstacle overcoming mode, the two driving mechanisms of the autonomous mobile device that are disposed in parallel are controlled to perform alternate rotation movements, thereby enabling the autonomous mobile device to more easily move onto the traversable type obstacle or move across the traversable type obstacle.

In addition, because the obstacle overcoming method is realized by using the two driving mechanisms and a corresponding control unit of the autonomous mobile device, there is no need to increase the electric motor power or to add new parts such as a new driving mechanism in the autonomous mobile device. Therefore, the obstacle overcoming method of the present disclosure can reduce the cost associated with overcoming obstacles. The obstacle overcoming is realized with relatively small modification.

Figure 2C:
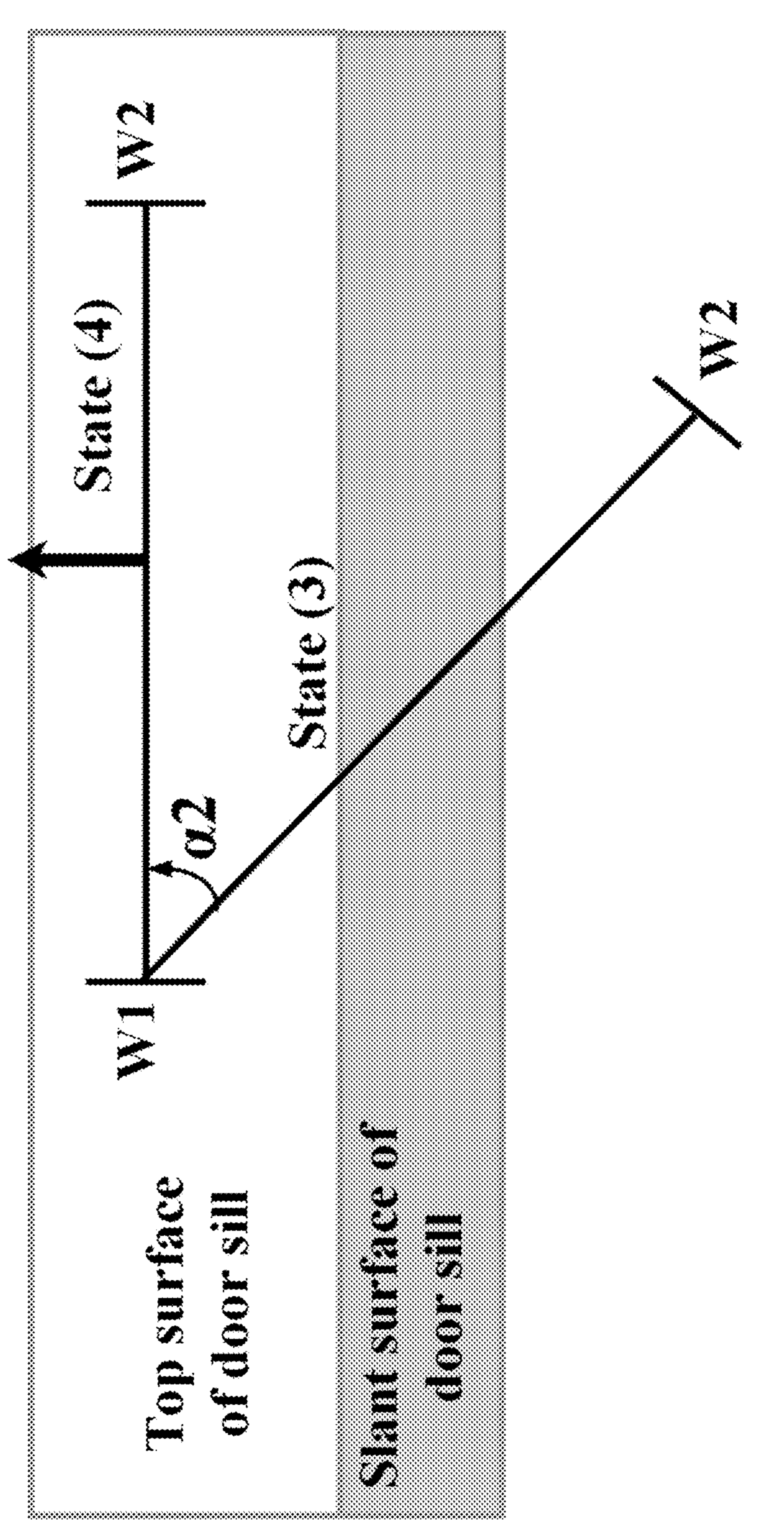

For the convenience of understanding, the obstacle overcoming method of the present disclosure will be described using the door sill as an example traversable type obstacle and with reference to FIGS. 2*a*-2*c* and 3*a*-3*b*. The specific illustration of the door sill shown in FIGS. 2*a*-2*c* may refer to the door sill shown in FIGS. 3*a*-3*b*. As shown in FIGS. 2*a*-2*c*, similar to FIG. 3*b*, the grey portion represents the slant surface of the door sill, the white portion represents the top surface of the door sill.

Referring to FIG. 2*a*, in state (1), the autonomous mobile device may encounter the door sill. The first driving mechanism W1 and the second driving mechanism W2 may be controlled to simultaneously retreat backwardly (e.g., rotate backwardly) for the first distance L1 (step S110), entering state (2) as shown in FIG. 2*a*. Then, referring to FIG. 2*b*, braking may be applied to the second driving mechanism W2, and the first driving mechanism W1 may be controlled to rotate forwardly for the first angle $\alpha 1$ around the second driving mechanism W2 (step S120), thereby moving onto the top surface of the door sill, entering state (3) as shown in FIG. 2*b*. Subsequently, referring to FIG. 2*c*, the first driving mechanism W1 may be secured (e.g., by applying braking to the first driving mechanism W1), and the second driving mechanism W2 may be controlled to rotate forwardly for the second angle $\alpha 2$ around the first driving mechanism W1 (step S130), thereby moving onto the top surface of the door sill, and entering state (4) as shown in FIG. 2*c*. As such, the first driving mechanism W1 and the second driving mechanism W2 may both arrive at the top surface of the door sill.

Figure 5:
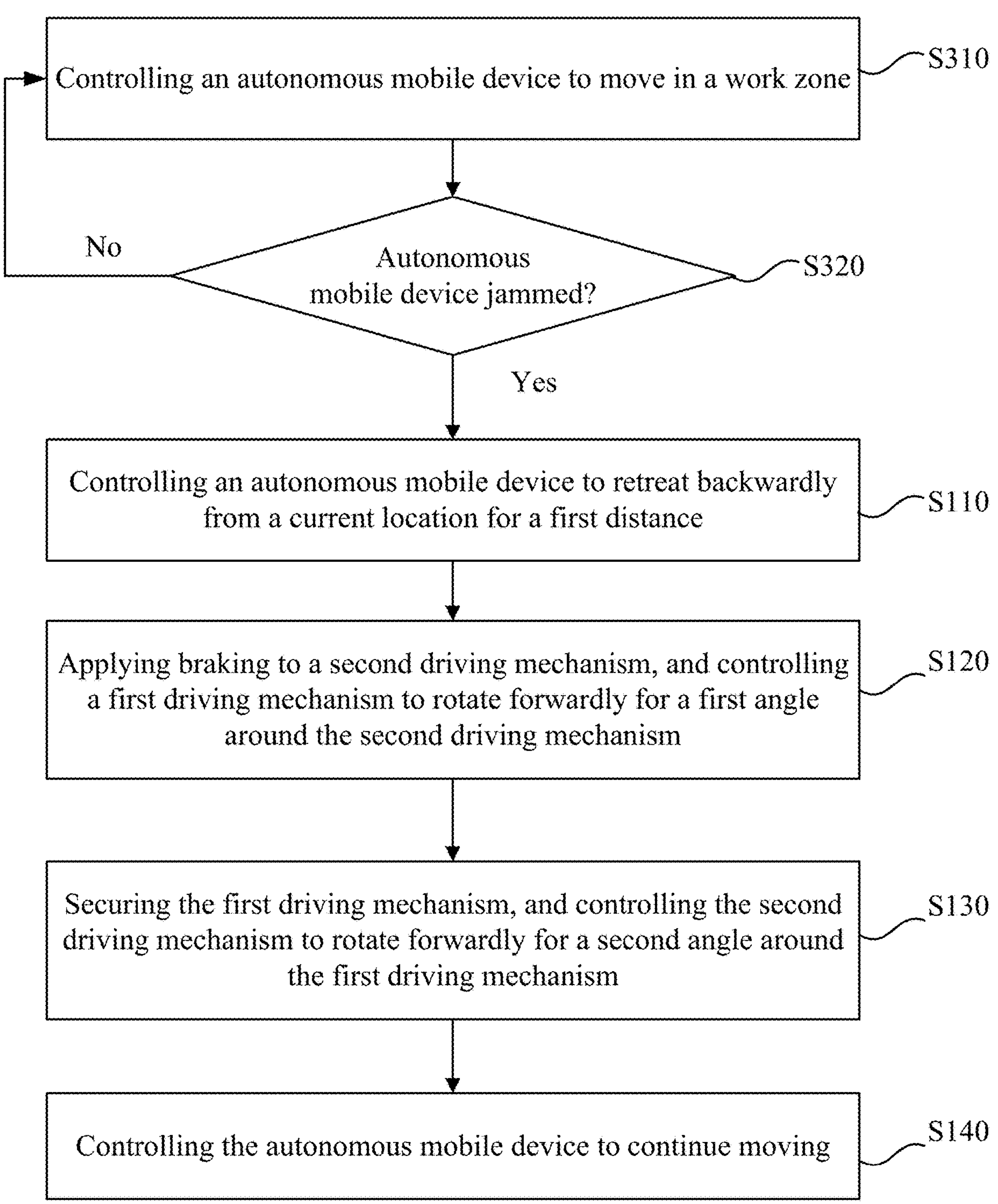
FIG. 5 is a flowchart illustrating an obstacle overcoming method for the autonomous mobile device according to an illustrative embodiment.

FIG. 5 is a flowchart illustrating an obstacle overcoming method for an autonomous mobile device according to an illustrative embodiment of the present disclosure. Referring to FIG. 1 and FIG. 5, compared with the obstacle overcoming method shown in FIG. 1, the obstacle overcoming method shown in FIG. 5 may also include steps S310 and S320 before step S110 is executed.

Step S310, controlling the autonomous mobile device to move in a work zone.

Step S320, determining whether the autonomous mobile device is jammed.

In this embodiment, corresponding components of the autonomous mobile device such as a sensor may detect, in real time, whether the autonomous mobile device is jammed by an obstacle. If it is detected that the autonomous mobile device is jammed by an obstacle, then the determination in step S320 is "Yes." At this moment, the autonomous mobile device may be controlled to move in a predetermined obstacle overcoming mode to attempt to move through the location of jamming, and after the obstacle is overcome, the autonomous mobile device may continue moving in a previously suspended moving mode or a newly chosen moving mode. Therefore, steps S110-S140 may be executed. Conversely, if it is not detected that the autonomous mobile device is jammed by an obstacle, then the determination in step S320 is "No," which indicates that at this moment no jamming occurs, therefore, there is no need to control the autonomous mobile device to move in the predetermined obstacle overcoming mode, and therefore, the method includes returning to the execution of step S310.

In this illustrative embodiment, during a period in which the autonomous mobile device moves in the work zone, the autonomous mobile device may determine whether the autonomous mobile device is jammed. Here, the method for detecting whether the autonomous mobile device is jammed may refer to the above descriptions of step S110. Due to the limitation of space, description of the method is not repeated.

According to the obstacle overcoming method of this illustrative embodiment, when the autonomous mobile device equipped with the first driving mechanism and the second driving mechanism that are disposed in parallel detects that it is jammed by an obstacle, first, the autonomous mobile device may move in a predetermined obstacle overcoming mode to attempt to move through the location of jamming, and then, after the obstacle is overcome, the autonomous mobile device may continue moving in a previously suspended moving mode or in a newly chosen moving mode. As such, when the autonomous mobile device is jammed by an obstacle, the predetermined obstacle overcoming mode may be executed to attempt to move through or move across the traversable type obstacle.

In this embodiment, when the autonomous mobile device is jammed, the autonomous mobile device may retreat backwardly for a first distance. Then, while applying braking to one driving mechanism (e.g., the second driving mechanism), at the same time, the autonomous mobile device may control the other driving mechanism (e.g., the first driving mechanism) to rotate for a first angle around the one driving mechanism (e.g., the second driving mechanism). Then, while securing the other driving mechanism (e.g., the first driving mechanism), at the same time, the one driving mechanism (e.g., the second driving mechanism) may be controlled to rotate for a second angle around the other driving mechanism (e.g., the first driving mechanism). As such, both of the two driving mechanisms can move across the slant surface of the obstacle (i.e., arrive at the top surface of the obstacle), thereby solving the technical issue related to the driving mechanisms being jammed in front of the obstacle.

For the convenience of understanding, a door sill is used as an obstacle, and with reference to FIGS. 2*a*-2*c*, 3*a*-3*b* and 4*a*-4*d*, the obstacle overcoming method of this embodiment is described.

Figure 4A:
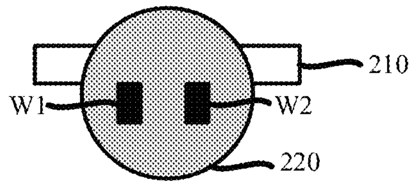
Figure 4B:
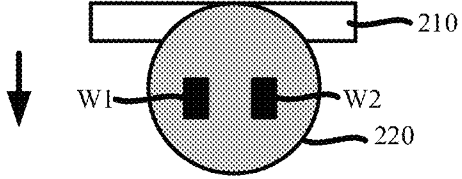
Figure 4C:
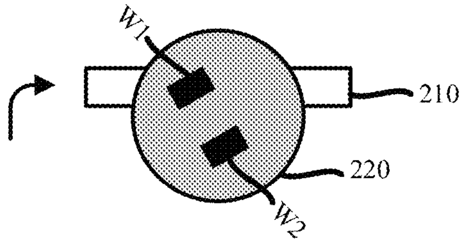
Figure 4D:
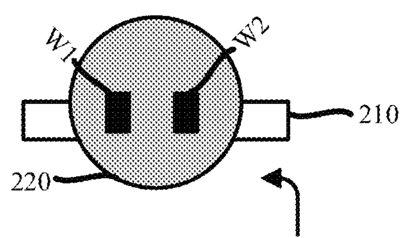

Referring to FIG. 4*a*, in step S320, it may be determined that an autonomous mobile device 220 is jammed. Subsequently, in step S110, driven by the first driving mechanism W1 and the second driving mechanism W2, the autonomous mobile device that is in state (1) as shown in FIG. 2*a* may retreat backwardly for the first distance L1. At this moment, the autonomous mobile device is in state (2) as shown in FIG. 2*a*. The schematic illustration of the relative position relationship between the autonomous mobile device 220 and an obstacle 210 changes from FIG. 4*a* to FIG. 4*b*.

Next, in step S120, braking may be applied to the second driving mechanism W2, and the first driving mechanism W1 may be controlled to rotate for the first angle $\alpha 1$ around the second driving mechanism W2. At this moment, the autonomous mobile device is in state (3) as shown in FIG. 2*b*. The schematic illustration of the relative position relationship between the autonomous mobile device 220 and the obstacle 210 changes from FIG. 4*b* to FIG. 4*c*.

A displacement component L2 of the first driving mechanism W1 in a forward facing direction (the thick arrow direction shown in FIG. 2*b*) that is perpendicular to the lower edge of the slant surface may be calculated based on the inter-wheel distance L0 between the first driving mechanism W1 and the second driving mechanism W2 and the first angle $\alpha 1$ using a relationship of $L2 = L0 \times \sin(\alpha 1)$. For example, if the inter-wheel distance L0 is 22 cm, the first angle $\alpha 1$ is 45°, then using the above relationship, the displacement component L2 may be calculated as $L2 = 22\ \text{cm} \times \sqrt{2}/2 = 15.55$ cm, such that the autonomous mobile device enters state (3) as shown in FIG. 2*b*. Therefore, through computation, it can be derived that after the second driving mechanism W2 moves for the first distance of 5 cm, and for 5 cm in the direction perpendicular to the lower edge of the slant surface, the second driving mechanism W2 will stop on the top surface at a location that is 5.55 cm away from the upper edge of the slant surface.

Next, in step S130, as shown in FIG. 2*c*, the first driving mechanism W1 may be secured, the second driving mechanism W2 may be controlled to rotate forwardly for the second angle $\alpha 2$ around the first driving mechanism W1. At this moment, the autonomous mobile device is in state (4) as shown in FIG. 2*c*. The schematic illustration of the relative position relationship between the autonomous mobile device 220 and the obstacle 210 changes from FIG. 4*c* to FIG. 4*d*.

As such, when in step S320 it is determined that the autonomous mobile device is jammed, through execution of steps S110, S120 and S130, both of the two driving mechanisms W1 and W2 can move across the slant surface, thereby solving the technical issue relating to driving mechanisms being jammed in front of the door sill.

Figure 6:
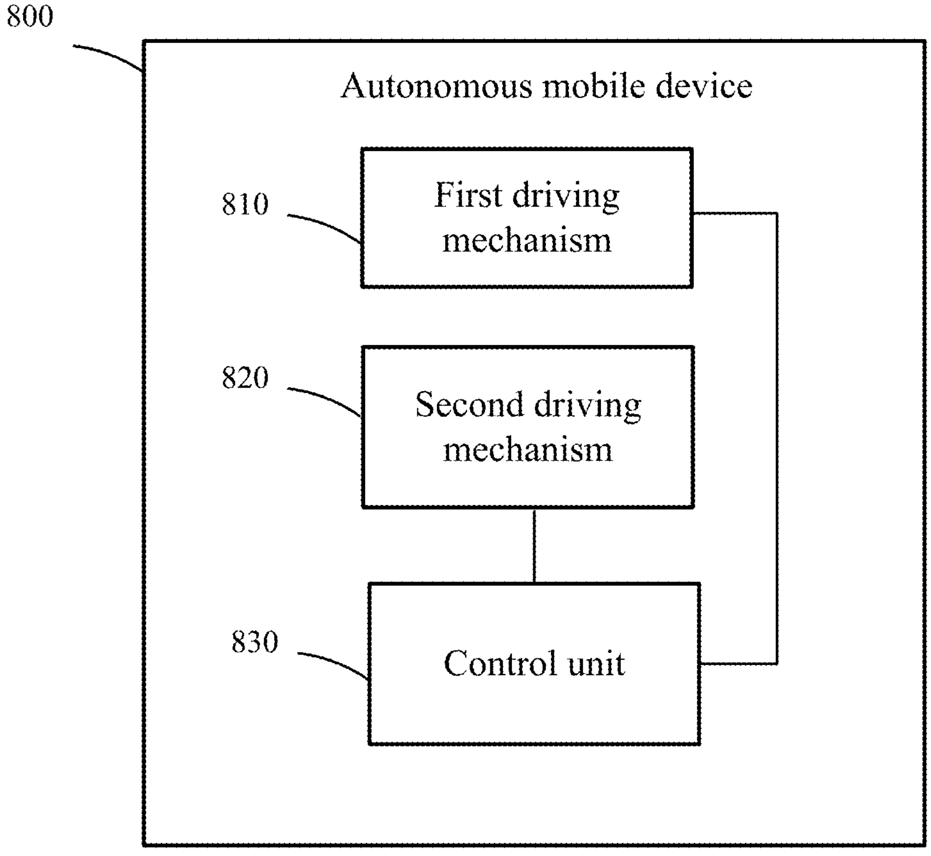
FIG. 6 is a diagram of the autonomous mobile device according to an illustrative embodiment.

FIG. 6 is a diagram of an autonomous mobile device according to an embodiment of the present disclosure. As shown in FIG. 6, an autonomous mobile device 800 may include a first driving mechanism 810 and a second driving mechanism 820 that are disposed in parallel, and a control unit 830. The control unit 830 may be connected with the first driving mechanism 810 and the second driving mechanism 820, and may be configured to control the autonomous mobile device 800 to move in a predetermined obstacle overcoming mode, and then to control the autonomous mobile device 800 to continue moving after the obstacle is overcome. Here, moving in the predetermined obstacle overcoming mode may include: controlling the autonomous mobile device 800 to retreat backwardly from a current location for a first distance; applying braking to the second driving mechanism 820, and controlling the first driving mechanism 810 to rotate forwardly for a first angle around the second driving mechanism 820; securing the first driving mechanism 810, and controlling the second driving mechanism 820 to rotate forwardly for a second angle around the first driving mechanism 810. The control unit 830 may include any suitable data processing device, which may include both software components and hardware components. For example, the control unit 830 may include a central processing unit (CPU), a graphics processing unit (GPU), a digital signal processor (DSP), or any other suitable data processing device that may include circuits, logic components, etc. In some embodiments, a processor included in the control unit 830 may retrieve and execute computer program instructions stored in a data storage device, such as a non-transitory computer-readable medium (e.g., a memory), and perform controls of the autonomous mobile device (including various other components included therein) to execute the disclosed obstacle overcoming method and other operations of the autonomous mobile device.

In some embodiments, the control unit 830 may be configured to detect whether the autonomous mobile device 800 is jammed, and based on a detection that the autonomous mobile device 800 is jammed, control the autonomous mobile device 800 to move in a predetermined obstacle overcoming mode.

In some embodiments, the first distance may be greater than or equal to 2 cm and smaller than or equal to 7 cm.

In some embodiments, the first angle may be greater than or equal to 40° and smaller than or equal to 60°.

In some embodiments, the first angle may be equal to the second angle.

With regard to the apparatus of the above embodiment, the specific method of operation for each unit included in there has been described in embodiments that relate to the method, and hence is not described again in detail.

The above described various embodiments of the present disclosure. The above descriptions are illustrative, and are not exhaustive, and do not limit the disclosed various embodiments. Without deviating from the scope and spirit of the described various embodiments, many modifications and changes are obvious to a person having ordinary skills in the art. The terms used in the present disclosure are selected for the purpose of best explaining the principles of various embodiments, actual implementations or improvements to the technologies in the market, or for the purpose of helping other persons having ordinary skills in the art to understand the various embodiments of the present disclosure.

What is claimed is:

1. An obstacle overcoming method for an autonomous mobile device, the autonomous mobile device includes a first driving mechanism and a second driving mechanism that are disposed in parallel, the obstacle overcoming method comprising:

detecting whether the autonomous mobile device is jammed by an obstacle; and based on a detection that the autonomous mobile device is jammed by the obstacle, controlling the autonomous mobile device to move in a predetermined obstacle overcoming mode;

wherein, controlling the autonomous mobile device to move in the predetermined obstacle overcoming mode, includes:

controlling both of the first driving mechanism and the second driving mechanism of the autonomous mobile device to simultaneously retreat backwardly from a current location for a first distance, wherein the first distance is determined based on an inter-wheel distance between the first driving mechanism and the second driving mechanism;

applying braking to the second driving mechanism, and controlling the first driving mechanism to rotate forwardly for a first angle around the second driving mechanism, wherein the first angle is selected such that a displacement component of the first driving mechanism in a direction perpendicular to a lower edge of a slant surface of the obstacle is sufficient to allow the first driving mechanism to arrive at a top surface of the obstacle; and securing the first driving mechanism, and controlling the second driving mechanism to rotate for a second angle around the first driving mechanism, wherein the second angle is selected such that a displacement component of the second driving mechanism in the direction perpendicular to the lower edge of the slant surface of the obstacle is sufficient to allow the second driving mechanism to arrive at the top surface of the obstacle.

2. The obstacle overcoming method of claim 1, wherein the first distance is determined based on the inter-wheel distance between the first driving mechanism and the second driving mechanism, a shortest distance between the lower edge and an upper edge of the slant surface of the obstacle, and the first angle.

3. The obstacle overcoming method of claim 2, wherein the first distance is selected based on the shortest distance, the inter-wheel distance, and the first angle to satisfy a relationship of $(L1+L3)/L0 \geq A \times \tan \alpha 1$ or $(L1+L3)/L0 \geq B \times \sin(\alpha 1)$, wherein, L1 is the first distance, L3 is the shortest distance, L0 is the inter-wheel distance, $\alpha 1$ is the first angle, A and B are coefficients greater than or equal to 1.

4. The obstacle overcoming method of claim 2, wherein the first distance is smaller than the inter-wheel distance.

5. The obstacle overcoming method of claim 4, wherein the first distance is smaller than one third of the inter-wheel distance.

6. The obstacle overcoming method of claim 1, wherein the first distance is greater than or equal to 2 cm and smaller than or equal to 7 cm.

7. The obstacle overcoming method of claim 1, wherein the first angle is greater than or equal to 40° and smaller than or equal to 60°.

8. The obstacle overcoming method of claim 1, wherein the second angle is greater than or equal to 40° and smaller than or equal to 60°.

9. The obstacle overcoming method of claim 1, wherein the first angle is equal to the second angle.

10. An autonomous mobile device, comprising:

a first driving mechanism;

a second driving mechanism, wherein the first driving mechanism and the second driving mechanism are disposed in parallel; and a control unit configured to:

determine whether the autonomous mobile device is jammed by an obstacle;

based on a determination that the autonomous mobile device is jammed by the obstacle, control the autonomous mobile device to move in a predetermined obstacle overcoming mode, wherein, when the control unit controls the autonomous mobile device to move in a predetermined obstacle overcoming mode, the control unit is also configured to:

control both of the first driving mechanism and the second driving mechanism of the autonomous mobile device to simultaneously retreat backwardly from a current location for a first distance, wherein the first distance is determined based on an inter-wheel distance between the first driving mechanism and the second driving mechanism;

apply braking to the second driving mechanism, and control the first driving mechanism to rotate forwardly for a first angle around the second driving mechanism, wherein the first angle is selected such that a displacement component of the first driving mechanism in a direction perpendicular to a lower edge of a slant surface of the obstacle is sufficient to allow the first driving mechanism to arrive at a top surface of the obstacle; and secure the first driving mechanism, and control the second driving mechanism to rotate forwardly for a second angle around the first driving mechanism, wherein the second angle is selected such that a displacement component of the second driving mechanism in the direction perpendicular to the lower edge of the slant surface of the obstacle is sufficient to allow the second driving mechanism to arrive at the top surface of the obstacle.

11. The autonomous mobile device of claim 10, wherein the first distance is determined based on the inter-wheel distance between the first driving mechanism and the second driving mechanism, a shortest distance between the lower edge and an upper edge of the slant surface of the obstacle, and the first angle.

12. The autonomous mobile device of claim 11, wherein the first distance is selected based on the shortest distance, the inter-wheel distance, and the first angle to satisfy a relationship of $(L\mathbf{1}+L\mathbf{3})/L\mathbf{0} \geq A \times \tan \alpha 1$ or $(L\mathbf{1}+L\mathbf{3})/L\mathbf{0} \geq B \times \sin(\alpha 1)$, wherein, L1 is the first distance, L3 is the shortest distance, L0 is the inter-wheel distance, al is the first angle, A and B are coefficients greater than or equal to 1.

13. The autonomous mobile device of claim 11, wherein the first distance is smaller than the inter-wheel distance.

14. The autonomous mobile device of claim 13, wherein the first distance is smaller than one third of the inter-wheel distance.

15. A non-transitory computer-readable storage medium, storing computer program instructions, which when executed by a control unit of an autonomous mobile device, cause the control unit of the autonomous mobile device to perform an obstacle overcoming method comprising:

detecting whether the autonomous mobile device is jammed by an obstacle; and based on a detection that the autonomous mobile device is jammed by the obstacle, controlling the autonomous mobile device to move in a predetermined obstacle overcoming mode;

wherein, controlling the autonomous mobile device to move in the predetermined obstacle overcoming mode, includes:

controlling both of a first driving mechanism and a second driving mechanism of the autonomous mobile device to simultaneously retreat backwardly from a current location for a first distance, wherein the first distance is determined based on an inter-wheel distance between the first driving mechanism and the second driving mechanism;

applying braking to the second driving mechanism, and controlling the first driving mechanism to rotate forwardly for a first angle around the second driving mechanism, wherein the first angle is selected such that a displacement component of the first driving mechanism in a direction perpendicular to a lower edge of a slant surface of the obstacle is sufficient to allow the first driving mechanism to arrive at a top surface of the obstacle; and securing the first driving mechanism, and controlling the second driving mechanism to rotate for a second angle around the first driving mechanism, wherein the second angle is selected such that a displacement component of the second driving mechanism in the direction perpendicular to the lower edge of the slant surface of the obstacle is sufficient to allow the second driving mechanism to arrive at the top surface of the obstacle.

* * * * *